United States Patent [19]
Mason

[11] 3,746,469
[45] July 17, 1973

[54] TURBOMACHINE ROTOR
[75] Inventor: George W. Mason, Indianapolis, Ind.
[73] Assignee: General Motors Corporation, Detroit, Mich.
[22] Filed: Mar. 3, 1971
[21] Appl. No.: 120,485

[52] U.S. Cl................... 416/213, 416/214, 416/215
[51] Int. Cl. ............................................ F01d 5/30
[58] Field of Search................. 416/19 A, 214, 195, 416/210, 212, 207, 201, 213, 208, 204, 215

[56] References Cited
UNITED STATES PATENTS

| | | | |
|---|---|---|---|
| 532,232 | 1/1895 | DeLaval.............................. | 416/214 |
| 648,158 | 4/1900 | Zoelly................................. | 416/214 |
| 1,122,925 | 12/1914 | Henrichsen........................ | 416/214 |
| 2,641,440 | 6/1953 | Williams........................ | 416/214 X |
| 2,660,400 | 11/1953 | Griffith ............................. | 416/210 |
| 2,757,900 | 7/1956 | Hersey................................ | 416/215 |
| 2,840,299 | 6/1958 | Paetz ............................ | 416/213 X |
| 2,981,517 | 4/1961 | Georges............................. | 416/214 |
| 3,003,745 | 10/1961 | Ferguson et al. ................... | 416/212 |
| 3,055,633 | 9/1962 | Pouit.............................. | 416/214 X |

FOREIGN PATENTS OR APPLICATIONS
| | | | |
|---|---|---|---|
| 735,184 | 5/1943 | Germany ............................ | 416/214 |

Primary Examiner—Everette A. Powell, Jr.
Attorney—Paul Fitzpatrick and Jean L. Carpenter

[57] ABSTRACT

A rotor stage of an axial-flow turbine includes a bladed wheel made up of circumferentially abutting radially extending elements, each of which has a blade at its outer end and a sector of the wheel hub at its inner end. The wheel hub sectors are mounted between abutments on a shaft, which may be undercut to provide a dovetail connection between the hub sectors and the abutments to hold the wheel together. The wheel sectors may be united by brazing or welding, in which case the abutments are not necessarily undercut. An interlock may be provided between adjacent wheel elements by a dovetail connection between the flanks of the elements or by separate keys engaging in slots in the flanks of the elements. The wheel portion of the rotor stage is made impervious to leakage of fluid through it by webs extending from the wheel elements into contact with each other or by annular disks covering the radially central portion of the wheel elements.

3 Claims, 10 Drawing Figures

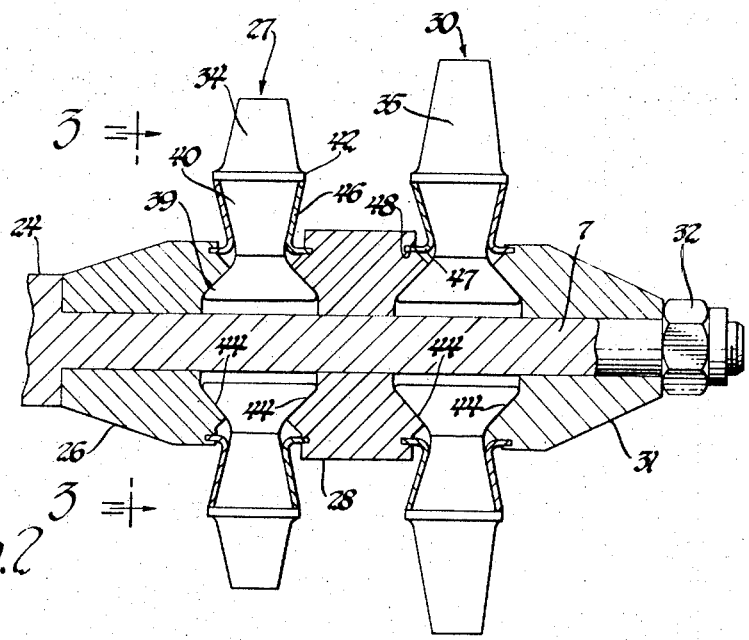
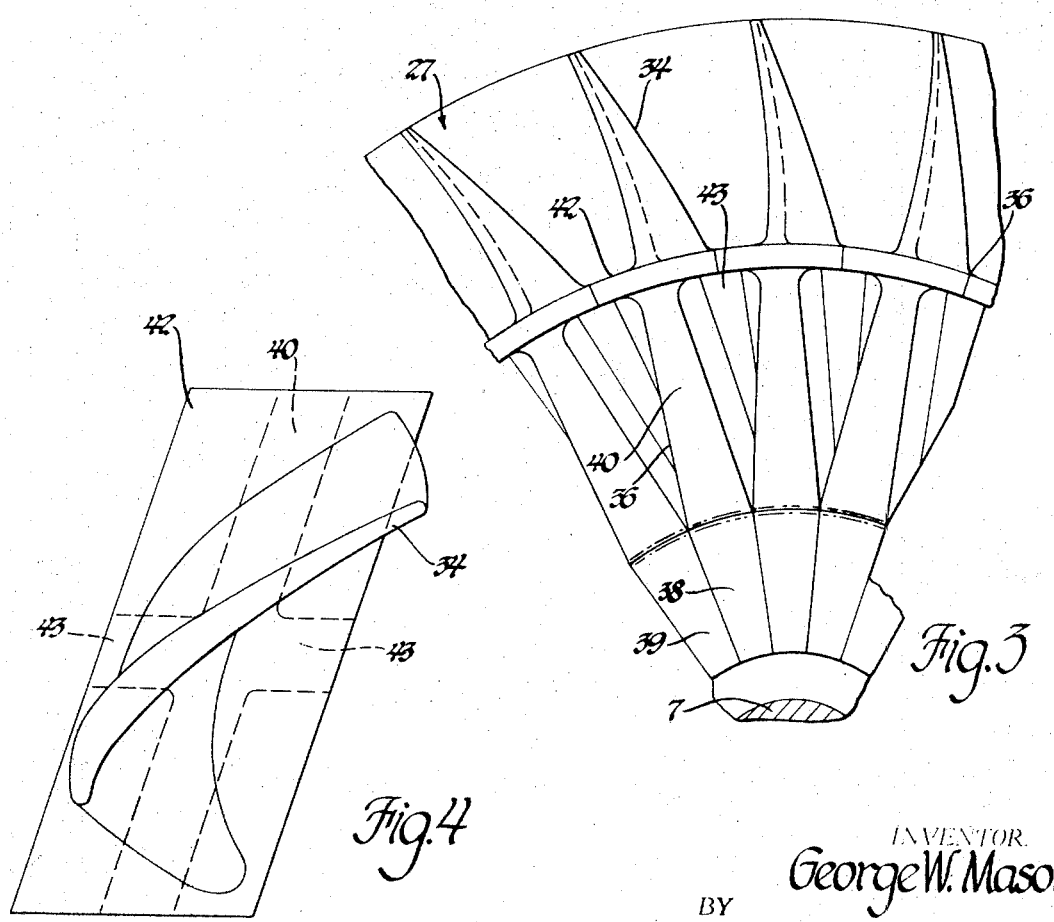

INVENTOR.
George W. Mason
BY
Paul Fitzpatrick
ATTORNEY

TURBOMACHINE ROTOR

DESCRIPTION

My invention relates to turbomachines, and particularly to improved structure intended primarily for axial-flow tubines, although the structure is applicable to other turbomachine installations. A rotor stage according to my invention is characterized by a wheel structure with circumferentially abutting radially extending elements of the wheel, each of which ordinarily includes one blade and includes a sector of a wheel hub. Structure on the shaft maintains the wheel hubs in alignment with the shaft and in place against centrifugal force.

A principal object of my invention is to provide a turbine or compressor wheel structure particularly suited to economical fabrication in large quantities and very well suited to small turbines. A further object is to provide a structure in which a wheel including the blades is made up of a number of preferably identical elements which may be individually manufactured and assembled to provide the wheel with blades. A still further object is to provide a turbomachine rotor wheel assembly which is not adversely affected to any considerable extent by stresses developed as a result of thermal gradients in the wheel. A still further object is to provide improved means and methods for integrating a ring of individual pieces into an annular turbomachine wheel with a ring of blades and provide improved means for connecting these to a shaft for rotation.

The nature of my invention and its advantages will be clear to those skilled in the art from the succeeding detailed description of preferred embodiments of the invention and the accompanying drawings thereof.

However, before proceeding with the detailed description, we may point out that the usual axial-flow turbine wheel structure is of one of two types. In one, the blades are cast or otherwise manufactured separately from the wheel and the individual blades are mounted onto the wheel either by machined attachments or by some welding process. Wheels of this sort are quite expensive. The other common expedient is to cast the wheel and blades as a unit. This has advantages but has the disadvantage that a rather complicated structure must be cast, and flaws in any part of the casting may destroy the usefulness of the entire wheel and blade casting.

Also, neither of the types of structures mentioned above in which the wheel is an integral disk are well adapted to avoid increased stresses because of the uneven heating of different radial zones of the wheel. My invention leads to the manufacture of a turbine wheel by the provision of simple readily cast parts, analogous in some respects to a blade with a long stalk, which may be very simply machined and assembled with simple abutment structure on a shaft to provide one or more turbine rotor stages in an axial-flow turbine.

Referring to the drawings,

FIG. 2 is a similar view of the rotor only of the turbine.

FIG. 3 is a partial elevation view to a larger scale, taken on the plane indicated by the line 3—3 of FIG. 2, with parts cut away.

FIG. 4 is a view of a single wheel element looking toward the axis of rotation thereof.

Figure 1:
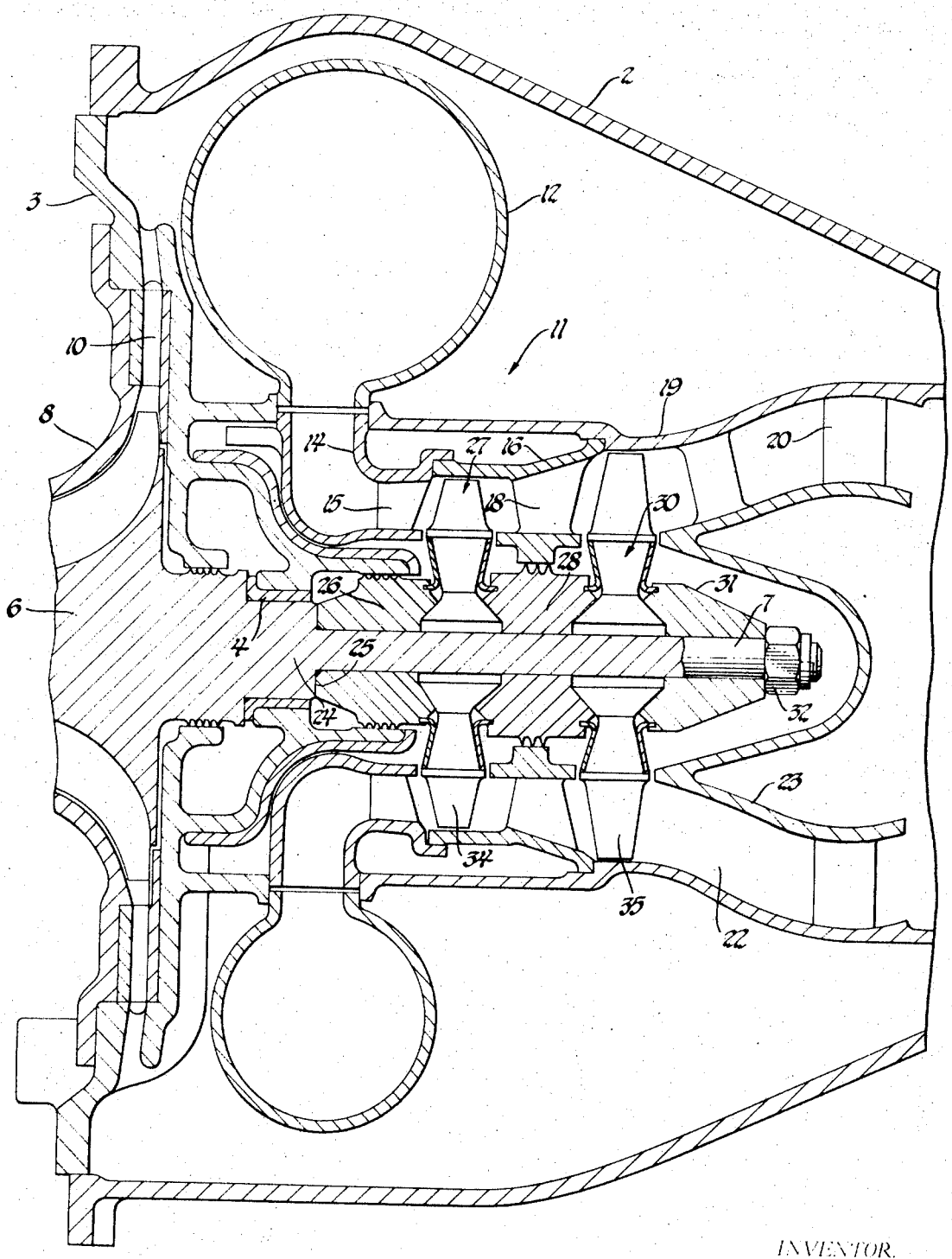
FIG. 1 is a section of an axial-flow turbine taken in a plane containing the axis of rotation of the turbine.
Figure 5:
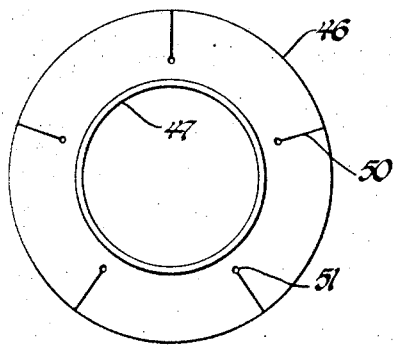
FIG. 5 is an elevation view of one form of flow blockage ring.

Referring first to FIG. 1, the structure there illustrated might be a portion of a gas turbine engine. It includes an outer case 2 and a bearing support plate 3 suitably fixed together. The bearing support 3 mounts a sleeve bearing 4 which provides rotational support for a compressor-turbine rotor aggregate which includes a radial-flow compressor rotor 6 and a shaft 7 extending in opposite directions from the bearing 4. The compressor rotor forms part of a compressor including a front plate or shroud 8 fixed to the bearing support 3 and a diffuser 10 into which and through openings in the bearing support the compressor discharges into the interior of the outer case 2. The compressed air may be fed to an engine, combustion apparatus, or the like, as desired. The turbine 11 includes the shaft 7, an inlet scroll 12 for the motive fluid, an annular first stage nozzle 14 including a row of vanes 15, a second stage nozzle 16 including vanes 18, and a turbine case 19. The turbine case 19 may be integral with or fixed to vanes 20 of a further turbine stage (not illustrated), the exhaust from the first two turbine stages flowing through a duct 22 between the case 19 and an inner wall 23. The inlet scroll 12 surrounds the first stage nozzle 14 and these two are mounted between a flange on the bearing support and the turbine case 19, which are suitably fixed together by means not illustrated.

The turbine shaft 7 includes an enlarged portion 24 which includes the journal which rotates in the sleeve bearing 4. A first abutment member 26 is slidably mounted on shaft 10 in engagement with the shoulder 25 between shaft 7 and journal 24. A first rotor stage 27 is disposed between abutment 26 and a second abutment 28 likewise piloted on the shaft 7. A second rotor stage 30 engages the abutment 28 and in turn is engaged by a third abutment 31 piloted on the shaft. As illustrated, the parts 26, 27, 28, 30, and 31 are held firmly together against the shoulder 25 by a nut 32 threaded onto the end of shaft 7. The rotor stages 27 and 30 include annular rows of blades 34 and 35, respectively. In operation of the engine, the motive fluid introduced through scroll 12 and first stage vanes 15 impinges on blades 34 from which the discharge flows through nozzle vanes 18 to blades 35 and on through the exhaust duct 22. The rotor stages, which are fixed on the shaft 7, drive the shaft and thereby the compressor 6 or other device driven by the turbine. No further explanation of a suitable environment for a rotor is considered necessary to an understanding of my invention.

For a better understanding of the rotor structure of FIGS. 1 and 2, reference will first be made to FIGS. 3 and 4, showing one form of rotor stage or bladed rotor wheel structure adapted for the first stage 27. The stage is made up of a number of elements 36 extending radially from the axis of shaft 7. Each element 36 comprises a hub portion 38 forming one sector of the hub 39 of the stage 27. It also includes a connecting portion 40 extending from the hub portion 38 to a platform 42. The hub portions 38 and platforms 42 engage the corresponding parts of adjacent elements 36 to define an annular hub and an annular ring of platforms at the base of blades 34. Connecting portions 40 thus essentially define the wheel portion between the hub and platform. Each element 36 is preferably cast as a unit, and the blades may be finished as required to a suitable airfoil contour more or less as indicated in FIG. 4. The margins of the platforms are machined to proper dimensions and the front and rear faces and side faces of the hub portions 38 are machined.

The bladed wheel should be impervious to flow past the inner surface of the platforms, and various means may be provided for this purpose. In the structure shown in FIGS. 3 and 4, webs 43 extend circumferentially from the connecting portions 40 into engagement with corresponding webs on adjacent elements. In this case the lateral surface of the web 43 is a continuation of the lateral surface of hub portions 38 and platforms 42, and the elements taper so that the entire ring of wheel elements forms a complete circle.

With this form, the set of elements 36 may be assembled in a suitable jig and brazed or welded together at the abutting faces of the hub portions 38 to bond the elements together and provide a unitary wheel. After this, the front and rear surfaces of the hub portions and the platforms may be ground or otherwise machined to the desired contour. With the structure of the rotor stages as shown in FIGS. 3 and 4, each rotor stage is mounted between two adjacent abutments such as 26, 28, and 31 illustrated in FIGS. 1 and 2. It will be noted that these are provided with concave conical faces 44 to engage the convex conical face of the hub made of the aggregate of hub elements 38. The coned surfaces are preferably at about a 45° angle. When the abutments are pressed together, as by the nut 32, the wheel is centered on the shaft by the abutments and the dovetail or overlapped connection between the abutments and the wheel accepts the centrifugal force developed on each element of the wheel by rotation. Thus, it is not necessary for the wheel to accept any significant hoop stress, the stress in the wheel being a radial stress outward from the anchorage in the abutment such as 26 and 28. The brazed or welded connection between the elements of the wheel serves to make the wheel an integral part suitable for finish machining and for handling, but does not significantly transfer stress between elements of the wheel. In this case, the radially outer portions of the wheel are free to expand differently from the inner portions without generating undesirable stress in the rotor.

The rotor structure illustrated in FIGS. 1 and 2 may omit the flow blocking webs 43 illustrated in FIGS. 3 and 4. As shown in FIG. 2, a flow blocking member or seal ring 46 is disposed adjacent each face of the rotor stage 27 or 30. Ring 46 as shown is slightly conical to abut the forward or rear face of the connecting portions 40 and has at its inner margin an axially extending flange 47. This flange is received in a circumferential groove 48 in the face of the abutment member to locate the seal ring 46. The seal ring is provided with a number, specifically five, of narrow radially extending slots 50 extending from the outer margin to slot terminating holes 51 so that the peripheral portions of the ring may expand differently from the internal or central portions. These rings provide substantially complete blockage of flow particularly when, as preferred, the slots 50 abut the faces of connecting portions 40.

Figure 6:
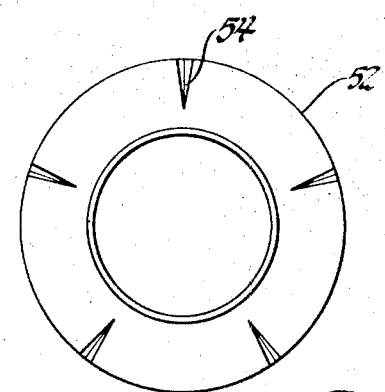
FIG. 6 is a similar view of a second form of flow blockage ring.

FIG. 6 shows another seal ring 52 which may be substituted for the seal ring 46. The structure is similar except that the ring has a number of radially extending tapering crimps 54 to provide for stress relief due to temperature gradients.

Figure 7:
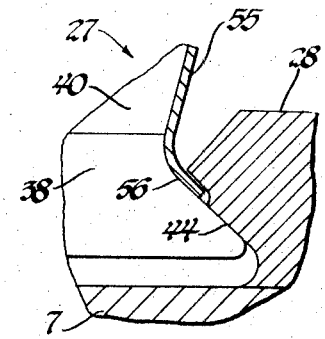
FIG. 7 is a fragmentary view illustrating a detail of rotor structure, taken on a plane containing the axis of rotation of the rotor.

FIG. 7 shows a slightly different arrangement of a seal ring, indicated as 55, which may be similar to the rings 46 or 52 except for a different arrangement of the flange, the flange 56 being adapted to ride on the outer surface of the conical face of the hub of the rotor stage.

As previously pointed out, the wheel structures described above depend upon the dovetail engagement between the hub portion of each element and the abutments on the shaft to retain the parts against a high centrifugal force. Another approach to employing the individual wheel elements to form the wheel, which can eliminate the necessity for the conical dovetail interlock between the hub elements and the shaft, is illustrated in FIGS. 8, 9, and 10.

Figure 8:
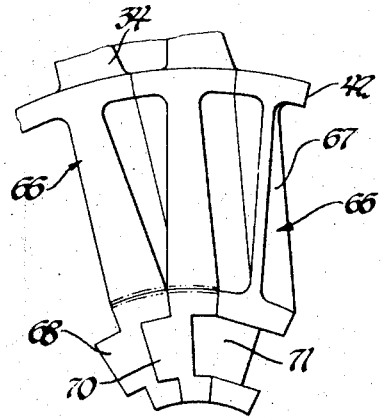
FIG. 8 is a fragmentary elevation view of a rotor illustrating one form of radial interlock between adjacent wheel elements.
Figure 9:
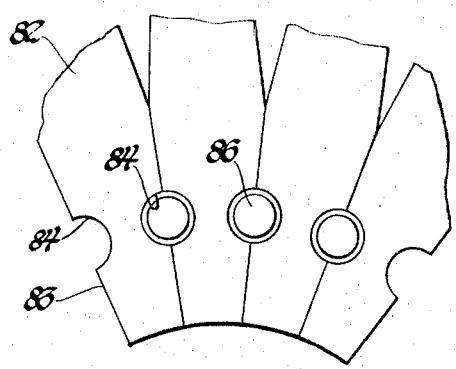
FIG. 9 is an enlarged fragmentary view showing a second form of interlock between adjacent wheel elements.

In FIG. 8, the modified rotor elements 66 correspond in general to the elements 36 of the preceding figures. As illustrated, they include a lateral web 67 corresponding to the web 43 of FIGS. 3 and 4. The platforms 42 and blades 34 may be as previously described. In this case, however, the hub portions 68, which may have flat or directly radial front and rear surfaces, have a radial interlock defined by tongues or tenons 70 which are received in grooves or mortises 71 in the adjacent flat face of the adjacent hub portion. With this structure, there is a direct mechanical interlock in the radial direction between adjoining hub elements. They are still brazed together, but in this structure the unity of the wheel is not dependent upon a shear stress in the braze metal between adjoining lateral faces of the hub elements. Thus, the retention under the overhanging face 44 of the abutment may be dispensed with.

Figure 10:
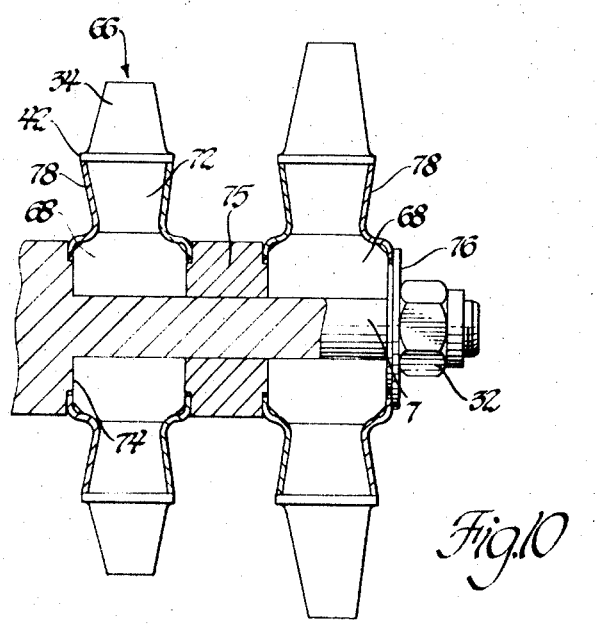
FIG. 10 is a sectional view of a rotor taken on a plane containing the axis of rotation thereof and illustrating a modified structure.

This is illustrated in FIG. 10 in which, however, there is also illustrated a structure embodying the seal ring type of flow blockage rather than the webs on the connecting portions of the wheel elements. These connecting portions are identified as 72.

As shown in FIG. 10, the hub portions 68 have radial faces and are mounted between radial abutments, these being an abutment 74 defined on the shaft 7, an abutment defined by a ring 75, and one defined by washer 76, all these being pressed together by the nut 32. The seal rings 78 may be of the general nature of those previously described.

FIG. 9 discloses another interlock between adjoining rotor elements, the elements being identified as 82. The hub portions 83 of these elements have semicylindrical slots 84 machined in them within which are mounted cylindrical dowels 86. In this case, when the hub portions and dowels are brazed together, the dowels provide a shear resisting connection between adjacent rotor elements. The structure of FIG. 9 may be mounted in a rotor similar to that of FIG. 8, as illustrated in FIG. 10.

The interlocks as illustrated in FIGS. 8 and 9 may be used with the conical hub faces as shown in FIG. 2, but ordinarily these are alternatives.

It will be seen from the foregoing that my invention provides a turbine wheel without the problems of the unit cast wheel and blades or those of the assembled wheel and blade structures. Also, since the adjacent elements of the rotor stage are fixed together only at the hub, this structure is tolerant of differential thermal expansions due to temperature gradients in the rotor stage.

The detailed description of preferred embodiments of my invention for the purpose of explaining the principles thereof is not to be considered as limiting or restricting the invention, since many modifications may be made by the exercise of skill in the art.

I claim:

1. A turbomachine rotor stage comprising, in combination, a shaft, first and second abutment means on the shaft defining between them a circumferential dovetail slot, and a wheel including a flaring hub held within the dovetail slot, the wheel comprising a ring of laterally abutting elements extending radially from the shaft, each element including a sector of the hub, a connecting portion extending outwardly from the hub sector, a platform at the outer end of the connecting portion, and a blade extending from the platform, the elements abutting and being bonded together at the hub portion to provide a unitary wheel hub and being unbonded radially outward from the hub portion, and abutting at the platforms, the stage including means to block flow between the connecting portions of adjacent elements.

2. A stage as defined in claim 1 in which the connecting portions include laterally extending flanges which abut to block flow between the connecting portions.

3. A stage as defined in claim 1 including an annular seal ring extending from the hub to the platforms to block flow between the connecting portions.

* * * * *